United States Patent [19]

Harthun

[11] 3,982,561

[45] Sept. 28, 1976

[54] COMBINATION SURGE RELIEF AND BACK FLOW PREVENTION VALVE

[75] Inventor: Norman Edward Harthun, San Carlos, Calif.

[73] Assignee: Telford Smith, Inc., San Carlos, Calif.

[22] Filed: July 17, 1975

[21] Appl. No.: 596,630

[52] U.S. Cl. ............................. 137/596.2; 251/83
[51] Int. Cl.² ........................................ F16K 11/10
[58] Field of Search............ 137/596.2, 596, 596.1, 137/512.3; 251/82, 83

[56] References Cited
UNITED STATES PATENTS

| | | | |
|---|---|---|---|
| 3,420,493 | 1/1969 | Kraft | 251/82 |
| 3,721,264 | 3/1973 | Coughlin | 137/596.2 |

Primary Examiner—Alan Cohan
Attorney, Agent, or Firm—Owen, Wickersham & Erickson

[57] ABSTRACT

A combination shut-off pressure surge relief and reverse flow prevention valve is disclosed comprising manually rotatable valve stem with a movable valve member at its lower end that is biased towards its closed position by a spring so that flow in a normal direction will open the valve but reverse flow is prevented. The pressure surge relief valve is completely enclosed within the rotatable valve stem and comprises a spring loaded slidable piston that is movable by abnormal pressure surges to expose relief ports for allowing controlled leakage under surge conditions. The leakage from the ports is deflected by a surrounding shroud on the handle of the valve stem.

6 Claims, 4 Drawing Figures

U.S. Patent    Sept. 28, 1976    3,982,561
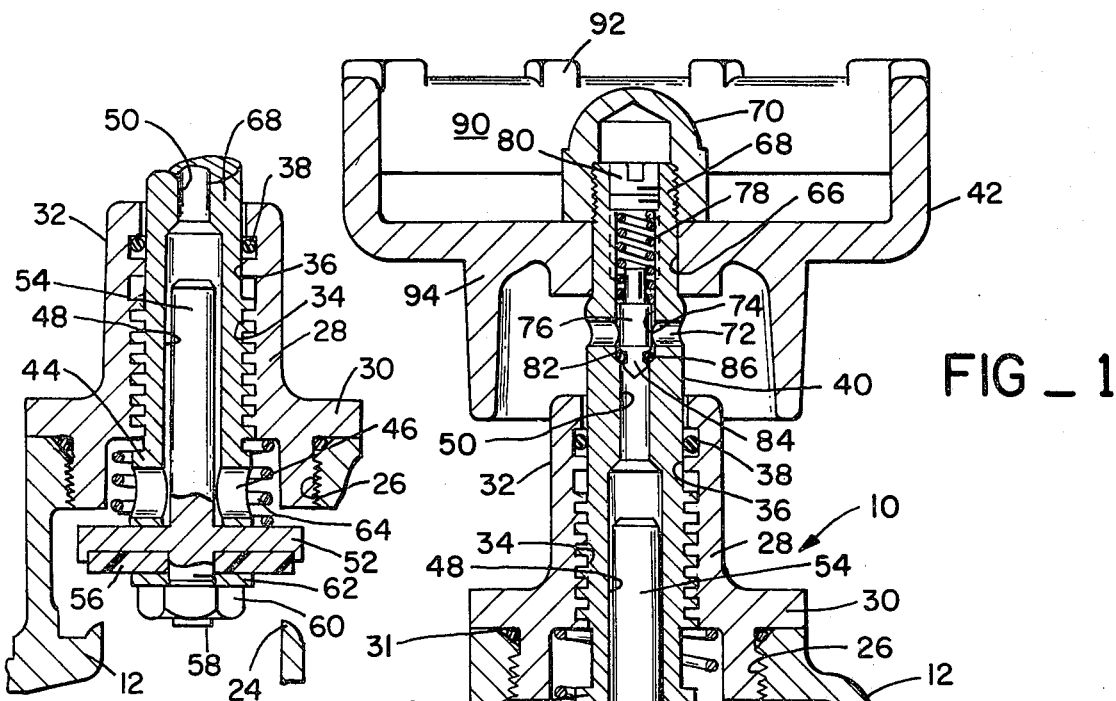
FIG_1
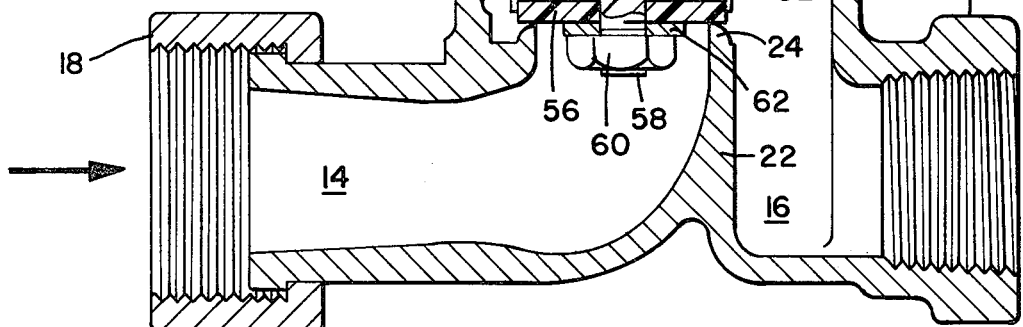
FIG_2
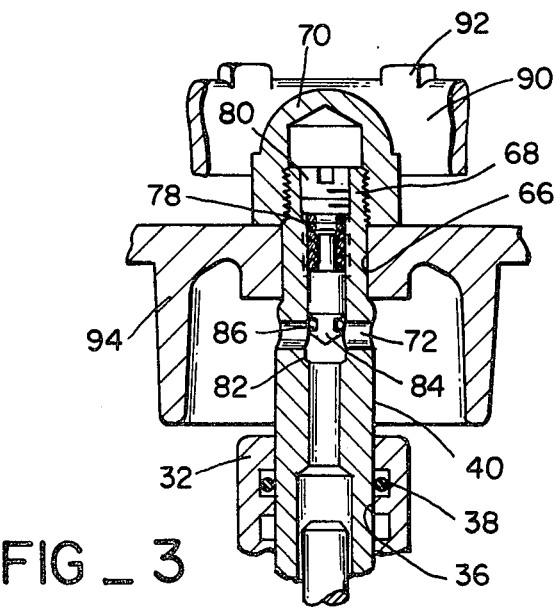
FIG_3
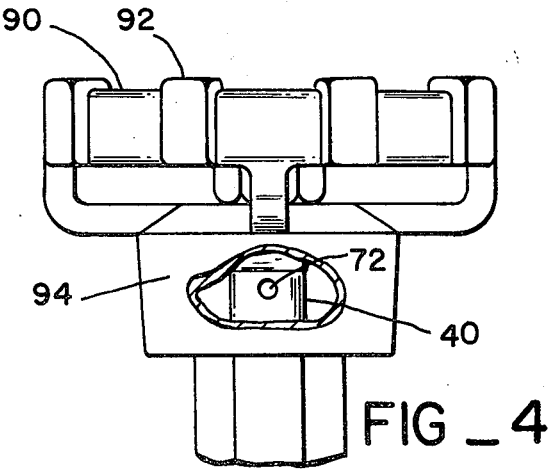
FIG_4

3,982,561

COMBINATION SURGE RELIEF AND BACK FLOW PREVENTION VALVE

BACKGROUND AND SUMMARY OF THE INVENTION

This invention relates to valves for fluid conduit systems and more particularly to an improved combination shut-off check and pressure surge relief valve.

In many forms of fluid conduit systems such as municipal water systems a shut-off valve is required and also one that will prevent any reverse flow as well as accommodate extra high level pressure surges in either direction. One valve in the prior art which attempted to accomplish the aforesaid multiple function is described in U.S. Pat. No. 3,721,264. However, in the device described therein a pressure surge relief valve is formed by components situated around the controllable valve stem. This arrangement proved to be a relatively bulky and complicated structure as well as expensive to manufacture. Also, the aforesaid valve structure was unreliable due to the fact that elastomeric O-rings were relied on to provide for sealing of the movable valve member. Such O-rings often caused unsatisfactory operating results because their friction characteristics varied under wet and dry conditions and also with irregular wall surface conditions of the cylinder surrounding the valve structure.

A combination valve of the type disclosed may be connected in a typical household water system to cold as well as hot water sources from which pressure surges may originate. It is necessary that the pressure relief be reliable as well as sensitive and responsive to such momentary surges. Moreover, if possible, any fluid that is allowed to escape during a pressure surge should be prevented from endangering or inconveniencing persons located near the valve. A general object of the present invention is to provide an improved combination valve that overcomes the disadvantages and solves the aforementioned problems associated with similar prior art valves.

A more specific object of my invention is to provide a combination valve of the type described wherein the elements forming a surge relief valve are completely contained within the manually operable valve stem.

Another object of the present invention is to provide a valve that is particularly well adapted for ease and economy of manufacture.

Yet another object of the present invention is to provide a surge relief valve for a combination shut-off and anti-reverse flow valve wherein any fluid expelled during a momentary pressure surge in the valve is prevented from contacting anyone near the valve.

Other objects, advantages and features of the invention will become apparent from a detailed description of one embodiment presented in conjunction with the accompanying drawing.

BRIEF DESCRIPTION OF THE DRAWING

FIG. 1 is a view in elevation and in section of a combination valve embodying the principles of the present invention and shown in its shut-off position;

FIG. 2 is a fragmentary view showing the valve of FIG. 1 in its open position;

FIG. 3 is a fragmentary view in elevation and in section showing the relief valve section for the valve of FIG. 1 as it appears when open due to a pressure surge;

FIG. 4 is a view in elevation of the upper portion of the valve rotated 90° from FIG. 1 with a portion broken away to show the relief valve orifice.

DETAILED DESCRIPTION OF EMBODIMENT

With reference to the drawing, FIG. 1 shows a valve 10 according to the invention which includes a lower body member 12 preferably formed as a single casting with in-flow and out-flow chambers 14 and 16. These chambers are generally tubular and have outer enlarged, hex-shaped portions 18 and 20, each with internal threads adapted to receive standard threaded conduit sections. The chamber 14 turns upwardly within the lower body member 12 along an internal wall portion 22 and forms an annular valve seat 24 that tapers to a relatively narrow, circular edge. The space above the seat 24 forms the other chamber 16 that extends downwardly along the opposite side of the internal wall portion.

At the upper side of the body member 12 is a threaded opening 26 within which is secured a nipple 28 having a flange portion 30 that fits against an annular surface of the body member when threaded in place. A sealing ring 31 fits within an annular space provided by a chamfered surface in the body member opening 26 to provide a fluid tight connection. Extending upwardly from the flange portion 30 is a boss portion 32 with a flat sided exterior surface and a series of internal threads 34. Above these threads is a cylindrical bore 36 having an annular slot containing an O-ring 38.

Extending through the bore 36 and sealed by the O-ring 38 is a movable stem 40 having a handle 42 fixed to its upper end. A series of threads on the stem are engaged with the threads 34 so that rotation of the handle and stem will cause the latter to move linearly with respect to the nipple. At the lower end of the stem 40 is an enlarged portion 44 with a transverse open passage 46 that communicates at right angles with an axial passage 48 extending upwardly through the stem. The diameter of the passage 48 is uniform in a lower bore portion which extends for approximately one half of the length of the stem, and above this lower bore portion is a bore 50 of a smaller diameter.

At the bottom of the stem and extending within the lower bore portion of the passage 48 is a valve member 52 with an upwardly extending cylindrical guide member 54. The diameter of this guide member is less than that of the passage 48 by an amount that affords an annular fluid flow passage around the guide member. The valve member has a circular shape with an annular recess for a resilient valve closure member 56, preferably made of some elastomeric material such as solid rubber. A threaded cylindrical portion 58 extends below the valve member 52 and through the closure member 56 so that a nut 60 can be secured thereto and taken up against a washer 62 to hold the seat member in place. A coil spring 64 is provided around the lower end of the stem 40 with its upper end seated against an inside wall of the nipple 28. The lower end of the spring bears against the disklike portion of the valve member 52 which, with its closure member 56, is axially aligned with the annular seat 24. Thus, with the valve set in its normal operating position the force of the spring 64 constantly urges the valve closure member 56 into contact with the seat 24, but the spring force is such that normal line pressure in the inflow chamber 14 will cause the valve member 52 to lift from the seat 24 and allow fluid to flow from chamber 14 to chamber 16.

At its upper end above the nipple 28 the stem 40 necks down to a somewhat smaller diameter and extends through a central opening 66 in the handle 42. A threaded end portion 68 on the stem extends above the opening 66 and is engaged by a cap nut 70 which secures the handle to the stem.

Just below the handle opening 66, the stem has a transverse relief passage 72 which extends diametrically through and communicates with a stem bore section that is slightly larger than the bore 50. Within this bore 74 is a slidable piston 76, the upper end of which is engaged by a coil spring 78. This spring is held within the stem bore 74 by an adjustable set screw 80 at the upper end of the stem. At the lower end of the piston 76 is a tapered portion with a conical surface 82 having a groove 84 of reduced diameter that forms a seat for an O-ring 86. A similar conical surface 88 between the bore sections 50 and 74 of the stem forms a lower stop for the piston just below the transverse relief passage 72.

The handle 42 has a generally circular configuration with protrusions 90, as shown in FIG. 4, on its upper portion 92 to facilitate gripping ease. Extending downwardly from the upper portion and preferably integral therewith is shroud-like annular portion 94 which is essentially an annular wall spaced outwardly from but extending below the openings for the relief passage 72.

The operation of my combination valve 10 should be readily apparent from the foregoing description but may be briefly reviewed as follows. FIG. 1 shows the valve in its closed position with the valve member 52 held against the seat 24 by the lower end portion 44 of the stem 40. When the valve is in its open or normal operating position of FIG. 2,, the lower stem portion 44 is moved upwardly. Thus, with the valve connected in a conduit the fluid flows from the conduit into the chamber 14. Fluid will flow through the valve if the normal line pressure is great enough to open the valve member against the force of the spring 64. If, as shown in FIG. 3, a pressure surge of a magnitude considerably higher than normal line pressure occurs in the conduit, fluid will flow upwardly around the valve member 52 through the ports 46, around the guide member 54 and against the piston 76 which is normally biased downwardly by its spring 78 to close the transverse passage 76. Such a pressure surge will cause the piston to move up and thereby open the passages 76 so that fluid can flow outwardly and relieve pressure. The momentary stream of fluid from the passages 76 is stopped by the annular wall 94 and deflected downwardly.

When the valve 10 is used as a shut-off valve, the handle is turned as in FIG. 1, so that the lower end portion 44 of the stem is against the valve member 54 and the closure member 56 is firmly held against the seat 24. This shut-off position prevents any flow from chamber 14 to chamber 16.

When the valve is moved from the shut-off position to its normal flow position, the stem 40 is rotated in the threads 34 until its enlarged lower portion 44 moves upwardly away from the valve portion 54. The spring 64 still urges the valve closure 56 against the seat 24, but its force is not strong enough to help it remain closed against the normal fluid line pressure. Thus, fluid is allowed to flow from chamber 14 to chamber 16. Yet, if main line pressure should decrease or if any reverse flow surges in the opposite direction through chamber 16 should occur, the valve member 54, urged by the spring 64, will quickly close and prevent any back flow.

Also, if any abnormal pressure surges occur from either chamber 14 or 16, the relief piston 76 will operate as previously described to allow fluid to escape from the passages 76 and thereby reduce negative effects in the conduit system from the abnormal pressure. Since the relief valve piston 76 is completely contained within the stem, the assembly is extremely compact and efficient. Also, the piston is well protected from dirt and its operating level is easily adjustable by the set screw 80.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. In a valve the combination of:
a hollow valve body divided by a wall into in-flow and out-flow chambers, there being a valve seat surrounding an opening in said wall communicating between said chambers;
internally threaded aperture means on said body concentric with said seat and communicating with said out-flow chamber;
a nipple means having an outer threaded portion which is screwed into said aperture means and an upwardly extending boss portion with an inner threaded portion;
a manually rotatable valve stem extending into said boss portion and having a threaded portion screwed into said inner threaded portion of said boss portion;
a valve head between said stem and said seat and movable by said stem against said seat to shut off said valve;
means extending from said valve head for guiding and maintaining said valve head in co-axial alignment with said stem and said seat, and permitting said head freedom to move toward and away from said seat when said stem is retracted from the valve closing position;
light spring means biasing said valve head towards said seat, said biasing action effectively closing said valve to prevent a reverse flow from said outflow chamber to said in-flow chamber but being ineffective to retard flow from said in-flow chamber to said out-flow chamber of water delivered to said in-flow chamber under normal domestic pressures;
said stem having a smooth cylindrical exterior portion extending upwardly from its said threaded stem portion and having a transverse relief passage;
a bore in said stem extending above said guiding means and communicating with said transverse passage;
a piston within said smooth bore of said stem;
a relatively heavy coil spring biasing said piston downward against the bottom of said bore and normally blocking said transverse passage;
a screw plug means making threaded engagement with said body to adjustably compress said spring against said piston;
whereby a surge of fluid pressure building up in said out-flow chamber will be applied to the inner end of said piston until the pressure of said piston against said piston biasing spring will compress the latter and lift the piston until said relief passage is opened allowing escape of fluid therethrough until said pressure surge subsides.

2. The valve as described in claim 1 including an annular deflector means spaced radially outwardly from said transverse relief passage.

3. The valve as described in claim 1 wherein said relief passage extends diametrically through said stem and its central bore thereby forming two relief ports.

4. In a valve the combination of:
- a hollow valve body divided by a wall into in-flow and out-flow chambers, there being a valve seat surrounding an opening in said wall communicating between said chambers;
- internally threaded aperture means on said body concentric with said seat and communicating with said out-flow chamber;
- a nipple means connected to said aperture means and having an upwardly extending boss portion with a bore having an inner threaded portion;
- a manually rotatable valve stem with a handle on its upper end and having a lower end portion extending into said boss portion and an external threaded portion screwed into its said inner threaded portion, said stem having a central bore extending axially from its lower end portion;
- valve means having a head portion between said lower end portion of said stem and said seat and movable by said stem against said seat to shut off said valve;
- guide means extending upwardly from said valve head portion and into said central bore of said stem for guiding and maintaining said valve head in coaxial alignment with said stem and said seat, and permitting said head freedom to move toward and away from said seat when said stem is retracted from the valve closing position;
- a relatively light spring means biasing said valve head toward said seat, said biasing action effectively closing said valve to prevent a reverse flow from said outflow chamber to said in-flow chamber;
- said stem having a cylindrical exterior portion extending upwardly from its said threaded stem portion and having a transverse relief passage that intersects an upper portion of its said central bore;
- a movable piston within said upper portion of said central bore of said stem;
- a relatively heavy coil spring in said central stem bore for biasing said piston into a position that blocks said transverse passage and thereby prevents flow through said central stem bore;
- whereby a surge of fluid pressure building up within said valve body will pass along said valve guide means within said central bore of said stem and be applied to the inner end of said piston until the pressure of said piston against said piston biasing spring will compress the latter and lift the piston until said relief passage is opened to allow escape of fluid therethrough until said pressure surge subsides.

5. The valve as described in claim 4 including an annular deflector means extending downwardly from said stem handle and spaced radially outwardly from said transverse relief passage.

6. The valve as described in claim 4 including a plug means threadedly engaged to the upper end of said stem within its central bore and adjustably compressing said heavy coil spring to thereby control the force required to move the piston and open the relief passage.

* * * * *